(12) United States Patent
Leymann et al.

(10) Patent No.: US 7,475,073 B2
(45) Date of Patent: Jan. 6, 2009

(54) TECHNIQUE FOR IMPROVING STAFF QUERIES IN A WORKFLOW MANAGEMENT SYSTEM

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 11/042,777

(22) Filed: Jan. 25, 2005

(65) Prior Publication Data

US 2005/0165809 A1 Jul. 28, 2005

(30) Foreign Application Priority Data

Jan. 27, 2004 (EP) .................................. 04100277

(51) Int. Cl.
*G06F 17/30* (2006.01)
(52) U.S. Cl. ........................ 707/10; 707/202; 702/187; 702/188
(58) Field of Classification Search .................. 707/10, 707/102, 202; 702/187, 188
See application file for complete search history.

(56) References Cited

U.S. PATENT DOCUMENTS 5,870,545 A * 2/1999 Davis et al. ................. 709/201
6,278,977 B1 * 8/2001 Agrawal et al. ................. 705/7
7,076,400 B2 * 7/2006 Dulberg et al. .............. 702/184
2002/0174093 A1 * 11/2002 Casati et al. .................... 707/1

* cited by examiner

*Primary Examiner*—Leslie Wong
(74) *Attorney, Agent, or Firm*—Hamilton & Terrile, LLP; Stephen A. Terrile

(57) ABSTRACT

A technique for improving staff queries within a process model of a workflow is provided. A workflow management system selects a set of individuals of a staff or resources to perform an activity of the process model based on a staff query. The members of the set act as candidates for executing the activity. The staff query takes into account the requirements needed to successfully execute the particular activity. The particular activity is then executed by one or more resources from the selected set or execution fails. Execution failure means that the assignment to the individual or resource was incorrect due to deficiencies in the staff query. Success or failure of execution is logged in an audit trail. Following execution failure, an improved staff query is generated for the given activity based on the information logged in the audit trail. This avoids subsequent suboptimal assignments of the activity to the individuals or resources. Improving the staff query makes explicit use of data mining techniques on the data maintained in the audit trail.

1 Claim, 4 Drawing Sheets

TECHNIQUE FOR IMPROVING STAFF QUERIES IN A WORKFLOW MANAGEMENT SYSTEM

BACKGROUND OF THE INVENTION

1. Field of the Invention

The present invention relates to the field of workflow management systems (WFMS) and in particular to staff queries for distributing the execution of activities among individuals or resources of a staff.

2. Description of the Related Art

Workflow management systems support the modeling and execution of business processes. Segmenting a business process into individual activities, the workflow management system controls who will perform which activity of a network of activities and which resources are exploited for this work. Typically, execution of the activities might be distributed across a multitude of different computer systems connected by some type of network.

The product IBM MQSeries Workflow (previously called IBM FlowMark) represents such a typical modern, sophisticated and powerful workflow management system. (IBM and MQSeries are trademarks of the International Business Machines Corporation.) It supports of the modeling of business processes as a network of activities. This network of activities, the process model, is constructed using a directed, acyclic, weighted, colored graph as the meta model. It should be noted that any other meta model used for modeling process models, such as a hierarchical meta model, can be used without departing from the spirit of the invention. The nodes of the graph represent the activities, which define the individual tasks that need to be carried out. In general, each of the activities is associated with a piece of code that implements the appropriate task.

When an assignment between an activity and some resource responsible for executing the activity is not fixed, i.e. an activity can be carried out by different resources, assignment between a resource and an activity is typically established by making use of a staff query. A staff represents the resources needed for executing or performing those activities of a process model that require resources for the execution. A staff typically consists of a plurality of individuals and/or resources featuring a variety of different capabilities, qualifications and specifications. Staff is typically organized according to some organizational structure that reflects the dependencies between the different resources and/or individuals.

In order to execute the individual activities of the process model, for each activity an appropriate individual or resource of the staff has to be retrieved and assigned to the activity for execution of the activity.

In order to achieve a high efficiency of a business process, the available resources and individuals of a staff must be exploited in a most efficient way. Therefore the assignment between activities of the process model and resources or individuals of a staff is a crucial task of a workflow management system. For example, when execution of a particular activity requires specific skills, only those individuals having these required skills should be selected for execution of this distinct activity. In contrast, activities not requiring specific skills should practically be executed by unskilled individuals of the staff.

In order to retrieve and to select appropriate individuals of the staff for executing a specific activity, staff queries are effectively used. A staff query is descriptive of an activity and specifies which skills and which resources are needed in order to successfully execute the activity. The staff query usually returns more than one resource, and one of the selected resources then claims the activity for execution. Selecting more than one resource for the potential execution of an activity is based on the assumption that the speed of a business process can be improved if several resources are given the opportunity to carry out the activity.

FIG. 1 is an illustration of a flowchart for assigning an activity to an individual of the staff by making use of a staff query. In a first Step 100, the processing of the activity is started by the workflow management system. Based on the activity in a successive Step 102, a staff query provided by the process modeler is resolved. Depending on the staff query, in Step 104, the workflow management system determines a set of individuals of the staff that matches the staff query and therefore become candidates for the execution of the activity.

In a next Step 106, for each determined individual, the workflow management system generates a work item that has to be executed by the corresponding individual or resource in order to execute the entire activity. Therefore, a whole set of work items is generated. Depending on its momentary workload, an individual of the set of individuals selects an appropriate work item from the list of work items in Step 108. By selecting a work item, the individual claims the activity, and the work items assigned to all other individuals are disabled. The individual that selected the work item in Step 108 subsequently starts to process the work item in Step 110. In the subsequent Step 112, it is checked whether the individual can handle the work item, i.e. whether the assigned activity can be successfully executed. If the selected individual is capable of processing the assigned work item, the individual will successfully terminate the processing of the work item in Step 114 and the workflow management system is notified of the successful execution of the activity.

A problematic situation arises when, in Step 112, it turns out that the individual cannot handle the assigned work item. Typically, there are two possibilities to cope with in such a situation. The individual can either cancel processing of the activity in Step 118 or alternatively can transfer the work item in Step 116. Cancellation of the processing of the activity in Step 118 means that the individual returns the claimed work item to the workflow management system. The workflow management system then re-enables the previously disabled work items for the other individuals that have been selected by carrying out the staff query. In this case, after canceling the processing of the work item in Step 118, the method returns to Step 108 where another individual of the determined set of individuals selects another work item.

Alternatively, instead of returning the claimed work item, the individual can also transfer the claimed work item in Step 116 to another individual of the staff that is in turn capable of processing the assigned work item. In this case, after transferring the work item in Step 116, the method returns to Step 110 where the newly assigned individual starts to process the work item. In general the transfer of a work item from a first individual to another individual requires that the first individual not being capable of processing the work item has knowledge that the second individual is in fact capable to successfully execute the work item.

Furthermore, it should be noted that the transfer of a work item from a first individual or resource to a second individual or resource does not require that the first individual has claimed the work item. Administrators with appropriate privileges can transfer work items from a first individual or resource to a second individual or resource without the first individual having claimed the work item.

Every work item that cannot be handled by a selected individual of the staff represents a waste of time and costs and slows down the entire processing of the process instance. In fact, every work item that is transferred or returned is a sign of an incorrect assignment between an individual of the staff and an activity of the process model and therefore indicates deficiencies in the staff query.

The present invention therefore aims to provide a method, a computer system as well as a computer program product for improving the staff query in a workflow management system in order to avoid transfers of work items among individuals of the staff as well as the returning of claimed work items due to inadequately selected individuals.

SUMMARY OF THE INVENTION

The present invention provides a method of improving a staff query of a process model that has at least one activity. This at least one activity is executed by at least one resource or individual of a staff having a plurality of resources or individuals. In order to retrieve appropriate individuals or resources that are capable to execute the activity, a first staff query is defined. Based on this first staff query, a first set of individuals or resources of the staff is selected as potential candidates for executing the activity. The first staff query is descriptive of the at least one activity.

Since the quality of the staff query is crucial for an efficient execution of the activity, the inventive method improves the quality of the first staff query by subsequently executing the steps of performing an analyzing procedure, generating a second staff query, and replacing the first staff query with the second staff query.

According to a further preferred embodiment of the invention, the analyzing procedure for improving the first staff query is performed on the basis of an audit trail which provides an execution history of the process model. During execution of the process model, the workflow management system monitors or logs the execution of activities, the return of work items, the selection of individuals of the staff, and the transfer of work items between single individuals or resources. The audit trail therefore represents a database providing information about execution of activities and assignment between activities and individuals of the staff of previously executed and currently executing process instances. Application of the analyzing procedure on the audit trail extracts deficiencies of previously applied staff queries.

Making use of the analyzing procedure in the present invention permits identification of the quality of a staff query as well as the gathering of statistical information of successful execution of activities of the process model. In essence one can easily find out which activity is most effectively executed by which individual or set of individuals of the staff. Moreover, a specification of those activities that are most effectively executed by a distinct individual of the staff can effectively be performed.

The analyzing procedure can also be used in an exclusive way, by identifying those individuals or sets of individuals that are not capable of successfully executing a given activity and moreover to specify those activities that cannot be handled by a given individual or set of individuals.

Once the analyzing procedure has been performed, a second staff query is generated on the basis of additional information provided by the results of the analyzing procedure. Since this additional information describes deficiencies in the first staff query, such as previously occurred transfers or returns of work items, the second staff query is generated with respect to this additional information and therefore represents an improved staff query compared to the first staff query.

The generation of the second staff query is performed with respect to the activity, the first staff query and additional information extracted by means of the analyzing procedure. After the second staff query has been generated, it replaces the first staff query. A second set of individuals of the staff is selected by the workflow management system when the second staff query is being carried out. Since the second staff query has improved compared to the first staff query, the second set of selected individuals of the staff matches better to the requirements of the at least one activity than the first set of selected individuals of the staff.

According to a further preferred embodiment of the invention, a transfer of execution of the at least one activity from a first individual to a second individual is logged by making use of the audit trail. A transfer of execution of the at least one activity means that a first individual has been assigned to a corresponding work item but is not capable of successfully executing a work item and therefore transfers or passes the work item to a second individual that is in turn capable of successfully executing this work item. Hence, the audit trail records and reports that the first individual was unable to execute the assigned work item and that the corresponding activity is finally performed by a second individual of the staff.

By means of the analyzing procedure, such a transfer of a work item can be identified and the second staff query can be improved in such a way that the workflow management system in future applications directly selects the second individual instead of the first individual of the staff for performing this particular activity. In this way, the overall performance of the entire process model is enhanced because a time and cost intensive transfer of a work item between individuals of the staff is avoided.

According to a further preferred embodiment of the invention, return of a work item signaling the cancellation of processing a claimed activity by an individual or resource is logged in the audit trail. Returning a work item of the at least one activity means that the individual that claimed the work item is not capable of successfully executing the activity identified by a work item and therefore cancels processing of the activity by returning the work item. Hence, the audit trail reports that the individual or resource fails to carry out the activity identified by the assigned work item and indicates that the corresponding activity needs to be performed by some other individual or resource previously selected by the staff query.

By means of the analyzing procedure, such a return of a work item can be identified and the second staff query can be improved in such a way that the workflow management system in future applications does not select the non-executing individual or resource. In this way, the overall performance of the entire process model is enhanced because a time and cost intensive abort of processing of a work item is avoided.

According to a further preferred embodiment of the invention, application of the inventive method of improving a staff query is limited to activities of the process model that were previously not successfully executed on the basis of the first staff query. In this way, only those activities that are associated to a staff query that is of rather low quality are subject to staff query improvement. In this way the inventive method leaves the execution of process activities untouched that have previously successfully been executed on the basis of the first staff query, indicating that the first staff query does not require improvement or that the first staff query is already an optimal staff query.

According to a further preferred embodiment of the invention, after each execution of an activity of the process model, a corresponding entry is made into the audit trail. Especially when the process model is repeatedly executed, i.e. the single activities of the process model are repeatedly executed, every execution of each activity is logged by means of the audit trail. In this way, the audit trail can either provide a complete execution history for each activity and/or a complete execution history for each individual of the staff.

According to a further preferred embodiment of the invention, the second staff query is generated by modifying the first staff query or by creating a staff query that is substantially different compared to the first staff query. In this way, the inventive method sensitively accounts for the quality of the first staff query. For example, when the first staff query has been formulated a bit to vaguely, thus leading to the selection of a first set of individuals of the staff which is huge, the second staff query can be generated by further specification of the first staff query, e.g. by adding further staff requirements to the first staff query.

When by means of the analyzing procedure it turns out that the first staff query has been totally wrong, the second staff query is generated as a completely new staff query without respect to the first staff query.

According to a further preferred embodiment of the invention, a second set of individuals of the staff is selected on the basis of the second staff query. Since the second staff query represents an improved staff query compared to the first staff query, it is assumed that the second set of individuals of the staff substantially differs from the first set of individuals. Since the quality of the staff query improved, the second set of individuals provides a better choice of individuals of the staff for successfully executing the activity.

According to a further preferred embodiment of the invention, the analyzing procedure is implemented as a data mining procedure providing sophisticated and improved means for data analysis on the basis of the data provided by the audit trail.

Generally, by applying a data mining procedure on a customer database, one might discover everyone who buys product A also buys products B and C, but six months later. Further investigation would then show if this is a necessary progression or a delay caused by inadequate information. In that case, marketing techniques can be applied to educate customers and shorten the sales cycle.

According to a further preferred embodiment of the invention, the analyzing procedure is performed on the basis of a predetermined schedule or in response to failure of execution of an activity. For example, irrespectively of the execution history, an analyzing procedure is performed on a regular basis, e.g. in predefined time intervals, by making use of the audit trail providing a complete execution history of all activities and individuals. The execution history must therefore encompass at least all events occurring between two successively following analyzing procedure runs. The analyzing procedure then inspects all events logged by the audit trail during a passed time interval in order to provide a basis for a subsequent generation of second staff queries and replacement of staff queries that turned out to be of low quality during the last execution interval.

In this way, the analyzing procedure and in particular the data mining procedure are performed within predefined time intervals in order to detect a plurality of low quality staff queries and to provide a basis for the generation of a plurality of second staff queries during one run of the data mining or the analyzing procedure.

Alternatively, the analyzing procedure can be performed in a dynamic way, i.e. after each detected work item transfer or return of a work item. In this way, a staff query of low quality resulting in a failure of execution of an activity triggers an analyzing procedure when the corresponding work item transfer or return is logged by the audit trail.

According to a further preferred embodiment of the invention, a signal indicating deficiencies of the organization structure is generated when the quality of the second staff query is not quantitatively better than the quality of the first staff query and the first staff query has been found to be of low quality. As the staff query cannot be improved, the only way to improve the efficiency of a business process is by changing the organization structure.

Therefore, a signal indicating deficiencies in the organization structure is generated when the second staff query does not improve by a specified margin compared to the first staff query. The generated deficiency signal can be further processed by a process modeler in order to modify the structure of the organization by, e.g. introducing new individuals or resources, changing hierarchies between individuals of the staff or introducing new organization units, such as departments and divisions.

Whether the second staff query has improved compared to the first staff query can effectively be determined by monitoring the transfer of work items as well as the return of work items. Since the transfer as well as the return of a work item directly indicates that an individual has been selected inadequately, it is logical that the preceding staff query resulting in this inadequate selection is of low quality and does therefore not represent a substantial improvement compared to the first staff query.

Moreover, the signal for indicating deficiencies in the organization structure can alternatively be generated when the second staff query exceeds a predefined level of complexity. A generation of a rather complicated and complex staff query typically indicates that the organization structure is sub-optimal.

In another aspect, the invention provides a computer system for improving a staff query of a process model having at least one activity. The computer system comprising means for performing an analyzing procedure on the basis of an audit trail, means for generating a second staff query on the basis of the performed analyzing procedure and means for replacing a first staff query by the second staff query.

In still another aspect, the invention provides a computer program product for improving a staff query of a process model having at least one activity. The computer program product comprises program means that are adapted to perform an analyzing procedure on the basis of an audit trail, to generate a second staff query on the basis of the performed analyzing procedure and to replace a first staff query by the second staff query.

BRIEF DESCRIPTION OF THE DRAWINGS

In the following description, preferred embodiments of the invention will be described in greater detail by making reference to the drawings, in which.

DESCRIPTION OF THE PREFERRED EMBODIMENT

Figure 2:
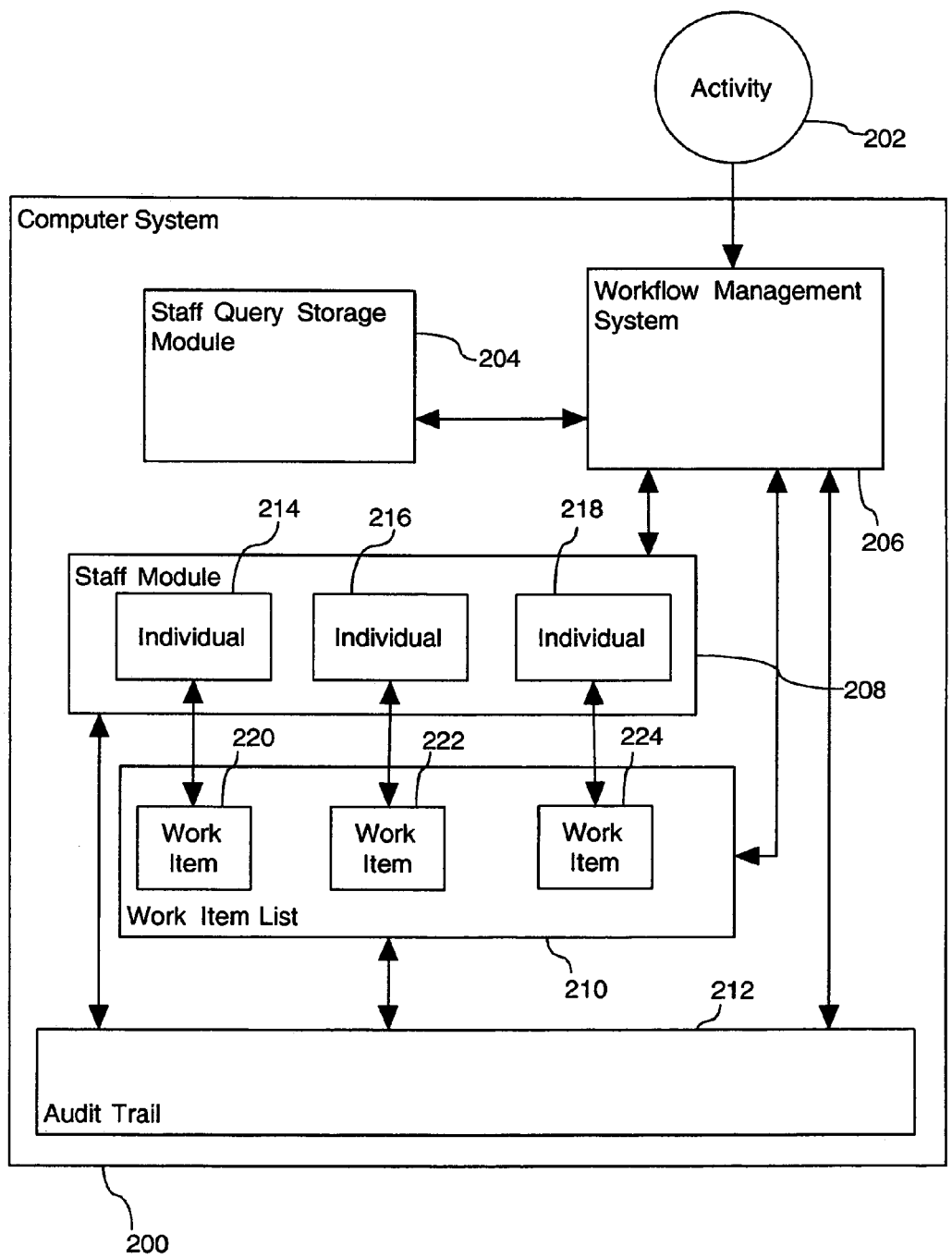
FIG. 2 shows a block diagram of a computer system for improving a staff query.

FIG. 2 shows a block diagram of a computer system 200 which can implement the system for improving a staff query associated with an activity 202 of a process model. The computer system 200 has a storage module 204 for storing staff queries, a workflow management system 206, a staff module 208, a work item list 210 and an audit trail component 212. In the block diagram illustrated in FIG. 2, the staff module 208 includes three resources or individuals 214, 216 and 218. The work item list 210 has three work items 220, 222 and 224. The work item 220 is assigned to the resource or individual 214, the work item 222 is assigned to the resource or individual 216 and the work item 224 is assigned to the resource or individual 218.

The crucial task of the workflow management system 206 is to select a resource to execute an activity. With respect to FIG. 2, the WFMS 206 needs to determine which of the individuals 214, 216 and 218 are capable of executing the activity 202. A set of resources or individuals capable of executing the activity is preferably determined, such that one or more of the selected individuals or resources as necessary executes the activity. In order to execute the activity 202, the workflow management system 206 of the computer system 200 generates a staff query on the basis of the properties of the activity 202. The generated staff query is stored in the staff query storage module 204. The staff query describes the activity and in particular specifies the minimum requirements that a resource or an individual of the staff must fulfill in order to be able to successfully execute the activity 202. Depending on the staff query, the workflow management system 206 selects a first set of individuals 214, 216, 218 of the staff 208 that match the staff query. Then, the workflow management system 206 generates work items 220, 222, 224, which correspond to resources or individuals 214, 216, 218 in the selected set of resources or individuals.

Depending on their momentary workload or preferences, each resource or individual 214, 216, 218 of the staff 208 may select the corresponding work item 220, 222, 224 in order to execute the activity 202. For example, when the individual 214 of the staff 208 selects the corresponding work item 220 of the work item list 210, the activity 202 is then executed by the individual 214. Meanwhile, the work items 222 and 224 are disabled for the individuals 216 and 218. This is to avoid having two resources or individuals perform the same piece of work simultaneously.

When the individual 214 is capable of executing the work item 220, the activity 202 is actually processed by the individual 214. In this case, the work item 220 is removed from the workflow management system 206 after successful execution of the work item. In the other case, when the individual 214 is not capable of successfully executing the work item 220, the individual 214 may either notify the workflow management system 206 by returning the appropriate work item or it may transfer the work item representing the piece of work to be done to one of the resources or individuals 216 or 218. The resources or individuals 216 or 218 then process the activity 202 by executing their corresponding work item 222, 224, or return the work item to the WFMS or transfer the work item to another resource or individual. When the workflow management system 206 has been notified that the assigned individual 214 is not capable of successfully executing the work item 220, the workflow management system 206 determines that the activity 202 has to be executed by the individual 216 or 218. This information that the resource or individual 214 is not capable of executing this activity/related work item is stored by the audit trail component 212 for use with respect to refining future queries for similar activities or work items.

For example, following the individual 214 not being capable of processing the work item 220, the individual 216 selects its corresponding work item 222 and finally executes the activity 202. Irrespectively of whether the assignment between the individual 216 and the activity 202 has been established via a transfer of a work item or via returning a work item to the workflow management system 206, all assignments between the individuals 214, 216, 218 and work items 220, 222, 224, as well as attempted executions of work items by individuals and successful executions of work items are logged and monitored by the audit trail component 212.

In the illustrated example, the resource or individual 214 was in the selected set of resources or individuals for executing the activity 202. This set was selected by making use of a first staff query generated by the workflow management system 206 and stored in the staff query storage module 204. Since the resource or individual 214 was not able to successfully execute the activity 202, the resource or individual 216 finally executed the activity 202 by executing its corresponding work item. As noted, this information is logged in the audit trail component 212. The information in the audit trail component can be subjected to an analysis process or data mining, so that when the activity 202 has to be executed repeatedly, the analyzing procedure or data mining procedure is applied and the resource or individual 214 is not identified as being in the set of resources. More generally an analyzing procedure, to be applied on the information in the audit trail component 212, immediately identifies that the resource or individual 216 is capable of executing the activity 202 and that the resource or individual 214 is not.

Based on the additional information gathered by means of the data mining procedure, the workflow management system 206 generates a second staff query and stores this second staff query in the staff query storage module 204. In order to assign the activity 202 to a resource or an individual of the staff 208, the second staff query is resolved by the workflow management system 206. As a result of the second, now improved staff query, only the resources or individuals 216 and 218 are selected as candidates for performing the activity 202, as they match the second staff query.

Making use of the knowledge extracted from the audit trail component 212 in combination with the analyzing procedure, the resource or individual 214 can effectively be excluded from the set of individuals deemed capable of executing the activity 202. Excluding the resource or individual 214 from the list of potential candidates can be performed in two different ways. First, the second staff query can be formulated in such a way that the workflow management system does not select the individual 214 when resolving the second staff query. Second, when the second staff query does not prohibit a selection of the individual 214 as a potential candidate, the workflow management system can still make use of the extracted knowledge and may prevent the resource or individual 214 from selecting the work item 220 which executes the activity 202.

In general, communication between the staff 208, the work item list 210, the audit trail component 212 and the staff query storage module 204 is controlled by the workflow management system 206. In this way, the workflow management system 206 can dynamically react to changes and modifications that occur during the execution of the activity 202 or during the selection of resources or individuals 214, 216, 218 of the staff module 208.

Figure 1:
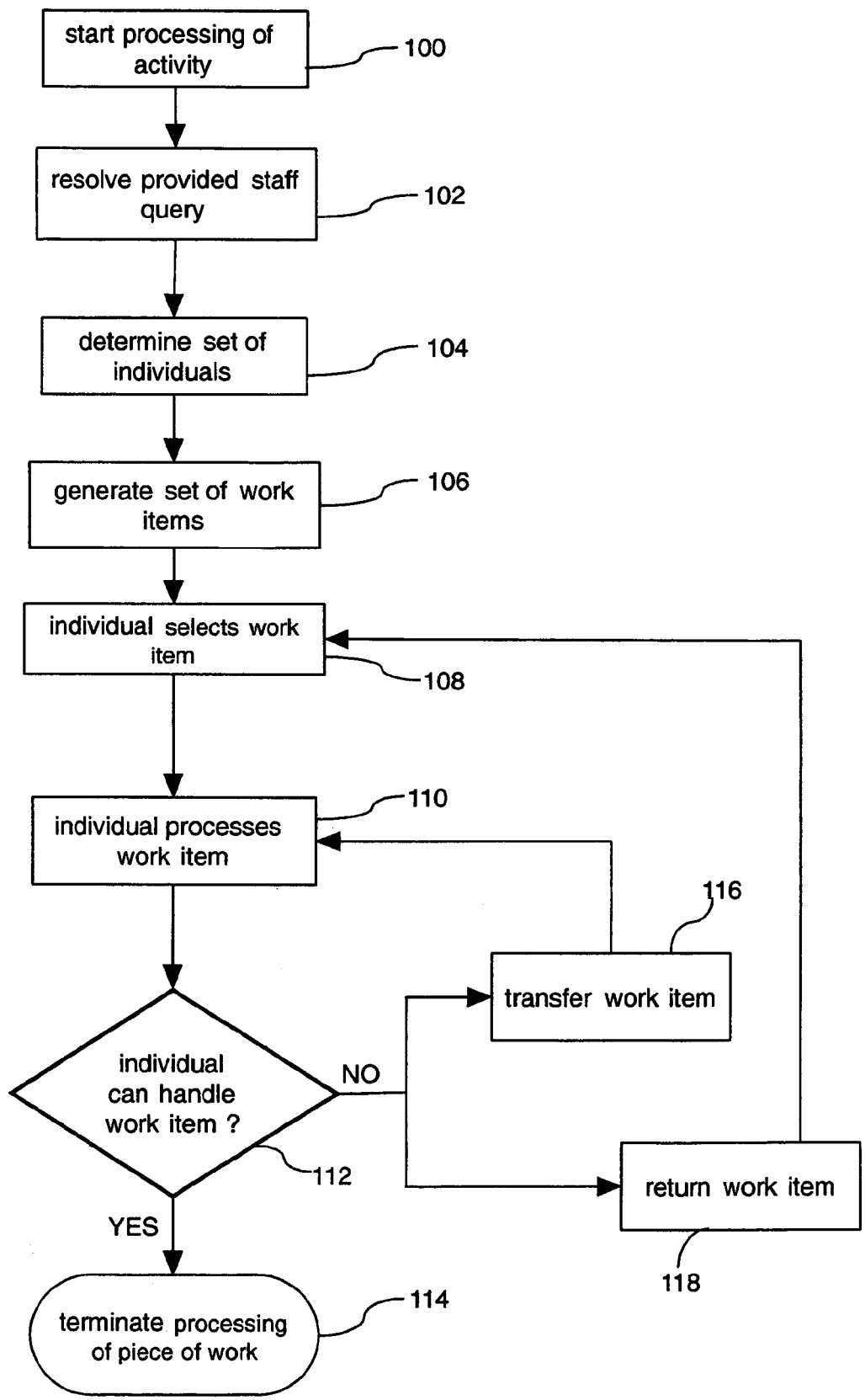
FIG. 1 shows a flowchart of the prior art for assigning the execution of an activity to an individual of a staff.
Figure 3:
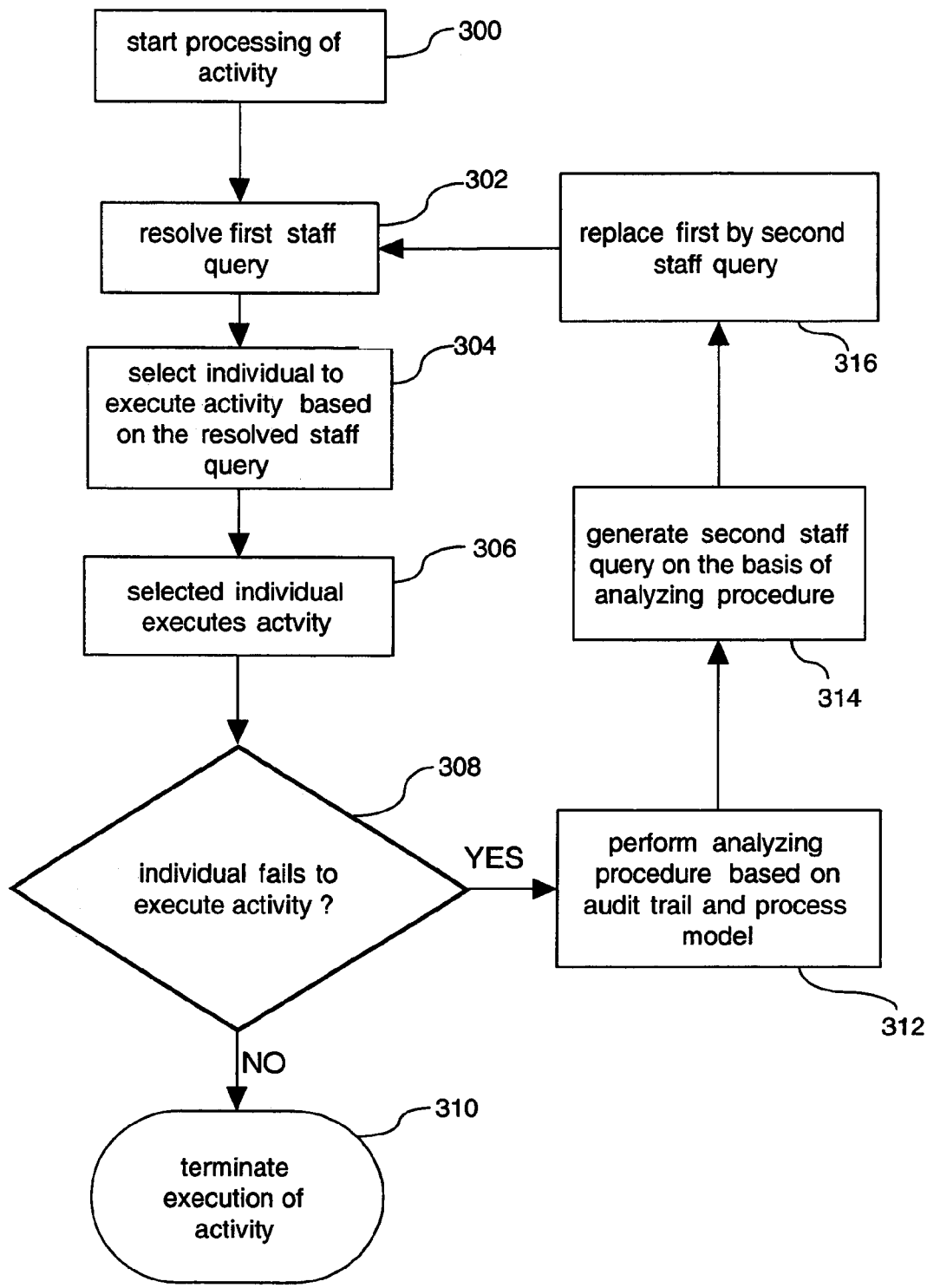
FIG. 3 is illustrative of a flowchart for improving a staff query.

FIG. 3 is illustrative of a flowchart describing the inventive method of improving of a staff query in a dynamic way. First, in Step 300 the processing of an activity is started. In successive Step 302, a first staff query provided by the process modeler is resolved or created. Depending on the resolved staff query, in Step 304, the workflow management system determines a set of resources or individuals from the staff that matches the staff query. The resources or individuals in the set therefore become candidates for executing the activity. Here, in Step 304, the single steps corresponding to Steps 102 through 108 of FIG. 1 are performed. After determination of a set of individuals or resources, a set of corresponding work items is generated and one member from the set of individuals or resources selects a corresponding work item. Thus the selecting resource or individual has claimed the activity as its own, indicating that the selecting individual will attempt to process the activity. This selection blocks the other individuals or resources from the set of individuals or resources from executing the activity concurrently via their corresponding work items. In principle, an individual or a resource is selected for the set based on the resolved staff query describing the requirements for executing the activity.

After the selection of an activity by an individual, the individual or resource starts to execute the activity in Step 306.

In the following Step 308, it is determined whether the selected individual or resource is capable of successfully execute the assigned activity. When it is determined in Step 306 that the individual or resource has successfully executed the activity, the process continues to Step 310, where the execution of the activity terminates following its successful completion.

However, in the critical case in which it is determined in Step 308 that the individual or resource has failed to successfully execute the activity, the processing proceeds to Step 312. In Step 312, the inventive analyzing procedure is executed making use of the information from the audit trail component, which provides an execution history of the entire process model. The analyzing procedure of Step 312 may simply determine which individuals or resources failed to execute distinct activities in the past and therefore generates a list of individuals to be excluded from being assigned to these distinct activities. In a more sophisticated embodiment, the analyzing procedure exhibits a data mining procedure that takes into account the entire or parts of the process model and/or properties of the different resources or individuals of the staff.

In subsequent Step 314, based on the performed analyzing procedure of Step 312, a second, improved staff query is generated. Generation of the second staff query can be performed on the basis of the first staff query by simply modifying the first staff query. For example, the resource or individual who failed to execute the activity may simply be excluded from set selection based on information in the second query. However, in case it was determined that the first staff query produced results that were far from an acceptable quality, the second staff query is preferably generated from scratch based on the results of the analyzing process irrespectively of and without reference to the first staff query.

After the second, improved staff query has been generated in Step 314, the first staff query is replaced by the second staff query in Step 316. After replacing the first staff query with the second staff query, the whole procedure of resolving a staff query (Step 302), selecting an individual or resource (or set of individuals or resources) on the basis of the staff query that can implement the activity (Step 304) and execution of the activity by the selected individual (or an individual or resource from the selected set) (Step 306) is repeated. Preferably, the workflow management system makes use of the second staff query the next time the corresponding activity is executed. This means that the benefits arising from the second, improved staff query are reaped every time the activity is subject to repeated application.

Moreover, if it is determined that the activity has not successfully been carried out by any of the resources in the first set of individuals or resources, the second staff query can directly be used, i.e. during first execution of the activity, to identify and to select another set of individuals or resources that are capable of successfully executing the activity.

Since the second staff query is generated when the first staff query has turned out to be suboptimal, a selection of resources or individuals from the staff based on the second staff query should be a better choice than the first selection of individuals based on the first staff query. Typically, the selection on the basis of the second staff query provides a set of individuals, each of which being capable of successfully handling the activity. In such a case, canceling of execution of an activity leading to a transfer or to a return of a work item should not occur.

In contrast, when it turns out that the second selection of individuals based on the second staff query does not represent a better choice compared to the selection based on the first staff query, this is an indication that the first staff query cannot be improved. However, this leaves the system in an unsatisfactory state, because the second staff query has been generated in response to a failure of execution of an activity based on the first staff query. Hence, it can be assumed that the first staff query was not optimal. A solution to this crucial situation lies in a suboptimal organization structure that has therefore to be improved. For example when none of the individuals of the staff is generally capable of successfully executing the activity, the execution of the process model cannot be optimized irrespectively of the quality of the staff query.

Therefore, when individuals or resources being selected with respect to the second staff query fail to execute the activity, the inventive method generates a signal or warning which indicates that the organization structure is suboptimal, as it is unable to handle assigned activities. The signal, alert or warning is directed to a system operator or other person in charge of the WFMS in order to indicate that the process model cannot be completed using the existing resources.

The audit trail plays a crucial role in the generation of the improved staff query. It is essential for enhancing the performance of processing of activities by avoiding the transfer of work items as well as avoiding suboptimal assignments between activities and the available resources or individuals of a staff.

Improvement of staff queries can be performed in a dynamic way, i.e. directly after a failure of execution of an activity is monitored, or it can be performed on the basis of a predefined schedule defining points of time, when an analyzing procedure or a data mining procedure is performed.

Figure 4:
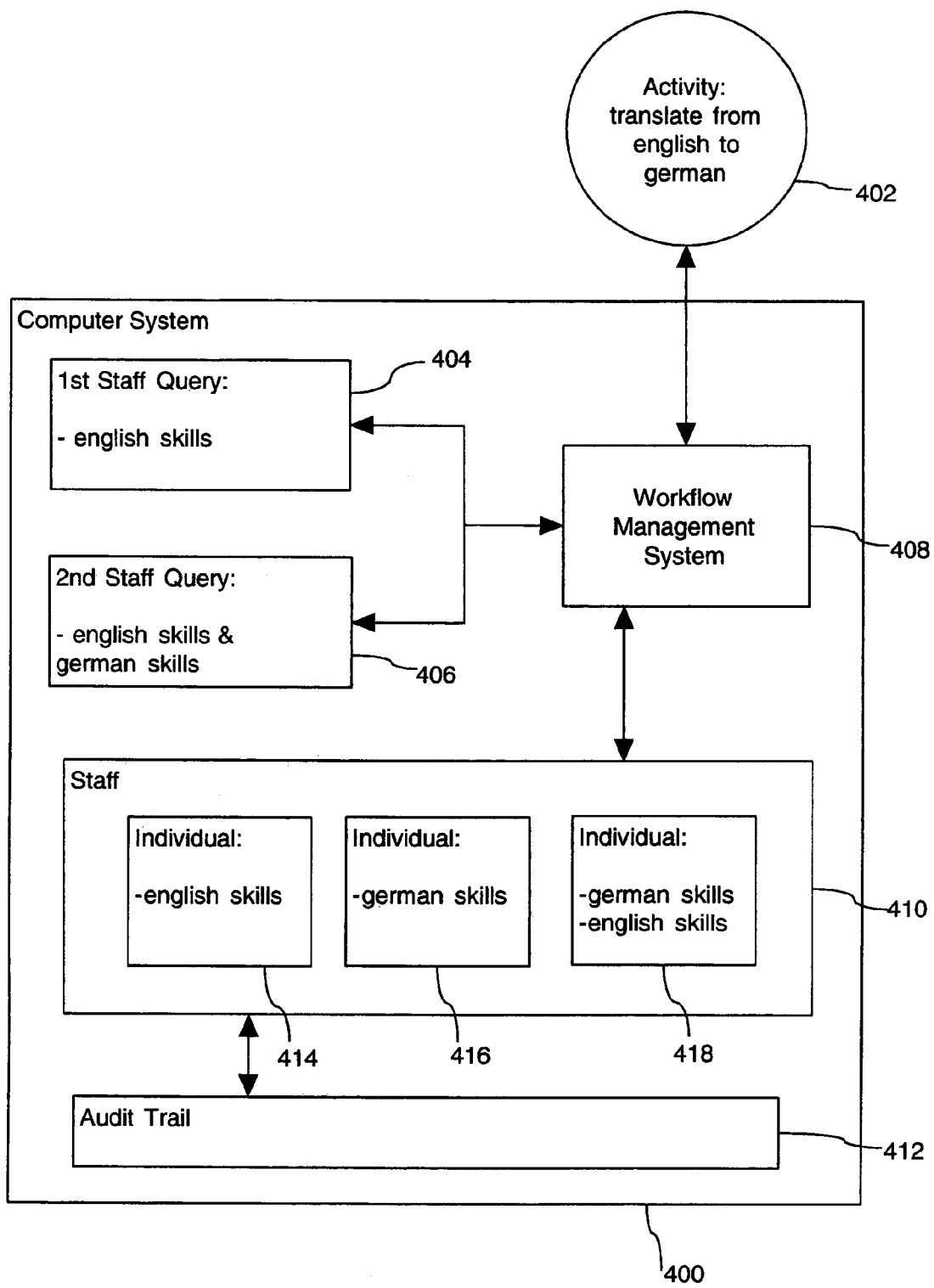
FIG. 4 shows a block diagram of a computer system for generating an improved staff query associated to a translation task.

FIG. 4 illustrates a block diagram of a computer system for generating an improved staff query associated to a translation task. Compared to FIG. 2, FIG. 4 illustrates a simplified block diagram which does not include an element comparable to the work item list 210 of FIG. 2. The computer system 400 receives an activity 402 to be executed. The computer system 400 includes a first staff query storage module 404, a second staff query storage module 406, a workflow management system 408, a staff module 410 as well as an audit trail component 412. The staff module 410 includes three different resources or individuals 414, 416, 418, each having different properties. The activity 402 represents a translation task for translating a document written in English into German. The individual 414 of the staff 410 has English skills, the individual 416 has German skills and the individual 418 has German and English skills. It is obvious that among the individuals 414, 416, 418 only the individual 418 is capable of successfully executing the translation activity 402, since translation requires both English as well as German skills.

The workflow management system 408 receiving the translation task from activity 402 generates a first staff query, which is stored in the first staff query module 404. In the example illustrated in FIG. 4, the first staff query is suboptimal since it specifies that for the execution of the activity 402 only English skills are needed. When in turn the workflow management system 408 resolves the first staff query, it selects the individual 414 having English skills as well as the individual 418 having English skills as well as German skills. Furthermore it might be the case that due to its reduced skills the individual 414 is not as cost intensive as the individual 418. Therefore the workflow management system 408 may preferably select the individual 414 in order to execute the translation task of activity 402. When in turn the individual 414 starts to process the activity 402, it will realize that it is not capable to successfully execute the translation task due to a lack of German skills.

Once this deficiency is detected, the workflow management system 408 is notified about this scenario and may invoke further actions to take place. For example, if the individual 414 has knowledge of the combined German and English skills of the individual 418, it may notify the workflow management system that the individual 418 is definitely capable of executing the activity 402 and directly transfer the associated work item to the individual 418. Alternatively, when the individual 414 has no knowledge about the properties of the other individuals 416, 418, it may simply cancel processing of the activity 402 and return the work item to the workflow management system 408. In response to a return of a work item, the workflow management system may simply select the remaining individual 418 of the set of potential individuals that were considered to be capable to successfully execute the activity 402. Both above described procedures shift the processing of the activity 402 from individual 414 to the individual 418. In either case, this information is monitored by the workflow management system 408 and stored or logged in the audit trail component 412.

Next time the activity 402 is invoked, the workflow management system 408 has knowledge about previous executions of the activity 402 via analysis of information in the audit trail component 412. By means of the analyzing procedure, the workflow management system 408 can determine that the individual 414 is not able to successfully execute a translation task. Furthermore, the workflow management system is aware that when specifying a query for a translation task, it is not sufficient to generate a staff query requiring only English skills but that a translation task requires a staff query that specifies both English and German skills.

Therefore by means of the data analyzing procedure, the workflow management system 408 generates a second staff query that specifies both English and German skills. The query may also specifically exclude the individual 414 since it is incapable of successfully executing the activity. The new query is stored by the second staff query storage module 406. When the workflow management system 408 resolves the second staff query, only a single individual 418 of the staff 410 matching the improved second staff query is selected. In this case, the correct individual 418 of the staff 410 is immediately selected thus enhancing the performance of the execution of the activity. The improvement of staff queries for assigning activities to resources or individuals of a staff therefore effectively reduces a wasted time, effort and costs that may typically arise during standard execution of activities of a process model.

While the present invention has been described with respect to specific embodiments shown in the drawings, the present invention is not limited to the specific embodiments shown in the drawings.

The invention claimed is:

1. A method for improving a staff query for a process model having activities associated therewith to be executed by a resource from an available group of resources, the staff query being utilized to identify a set of the resources which can execute one of the activities, said method comprising the steps of:
   generating a first staff query for an activity;
   selecting a first set of resources for executing the activity based on the first staff query;
   storing information regarding execution of the activity in an audit trail, said storing step further comprising storing information in the audit trail regarding a transfer of the activity from a first resource to a second resource following failure of the first resource to successfully execute the activity and storing an entry regarding execution of each of the activities in the audit trail, each entry providing information with respect to an execution history for the corresponding activity;
   if the activity was not successfully executed by one of the resources from the first set of resources,
   analyzing the audit trail, said analyzing step being performed at predefined time intervals;
   generating a second staff query based on results from the analysis of the audit trail, said generating step further comprising generating the second staff query by modifying the first staff query based on information contained in the audit trail and generating the second staff query from information contained in the audit trail only if the first staff query fails to meet a specified standard; and,
   selecting a second set of resources for executing the activity based on the second staff query; and,
   generating an alert signal when the second staff query does not result in an improved set of resources for executing the activity.

* * * * *